Patented Apr. 12, 1938

2,114,043

UNITED STATES PATENT OFFICE 2,114,043

MIXED ESTERS OF HIGHER ALCOHOLS

Heinrich Bertsch, Chemnitz, Germany, assignor to American Hyalsol Corporation, Wilmington, Del., a corporation of Delaware No Drawing. Application November 29, 1933, Serial No. 700,356

11 Claims. (Cl. 260—99.12)

This invention relates to sulfonation products of higher fatty alcohols and their method of preparation. More specifically it relates to mixed cetyl, oleyl and stearyl sulfate esters and their salts.

This invention has as an object the preparation of certain mixtures of sulfuric acid ester salts of the normal straight-chain primary higher fatty alcohols having a high water solubility and great efficiency in the wetting, dispersing, emulsifying and detergent arts.

Another object is to prepare sulfation products of mixed higher alcohols obtainable from sperm oil, the same being accomplished in accordance with the present invention by saponifying the sperm oil, distilling off the resulting higher aliphatic alcohols and treating these alcohols with a strong sulfating agent. A further object of the invention is the application of these novel sulfation products to the cleansing, dispersing, emulsifying and wetting arts. Other objects will appear hereinafter.

The following example illustrates the various forms in which the invention may be applied:

Example

One thousand kilograms of sperm oil are charged into a 2500 litre iron sperm oil still and heated under 20 mm. absolute pressure to 180° C. One hundred ten kilograms of flake sodium hydroxide are then added and the heating continued under atmospheric pressure. The reaction is exothermic and the temperature rises rapidly to 250° to 254° C. A vacuum is then slowly created in the still and a jet steam introduced, whereupon the fatty alcohols are distilled out of the reaction mass under a pressure of about 20 mm. The distillate so obtained is heated to 80° to 90° C. under a pressure of about 20 mm. to remove the small amount of water present yielding a product consisting of approximately 50% oleyl alcohol, 40% cetyl alcohol, and 10% stearyl alcohol. Three hundred sixty kilograms of a blended mixture of several distillates obtained as above after cooling to 40° C. are charged into a 1200 litre enameled sulfonator. During stirring and cooling, 360 kilograms of 100% $H_2SO_4$ are slowly added over a period of about two hours. The temperature of the reaction mass slowly rises during the run from 40° to 45–48° C. After all the acid has been added the stirring is continued for five minutes after which the mass is dropped into a lead-lined iron neutralizer tank of 5000 litres capacity, fitted with a stirrer and jacket for cooling and heating, said tank having been previously charged with 700 kilograms of water, 850 kilograms of ice, and 660 kilograms of 35% sodium hydroxide. When all the solvent mass has been dropped into the neutralizer, 150 kilograms of sodium sulfate are added. The mixture is stirred for about an hour and then run through a spray drier. It is pumped to the top of the drier where it flows down through a center pipe on to a centrifugal disk running at about 7000 R. P. M. The temperature is maintained at about 85° to 90° C. as measured on a thermometer at the level of the disk. Twelve hours are required to dry a batch of this size which weighs when dry about 980 kilograms.

While the above example has described the preparation of the sodium salt of mixed sperm oil alcohol sulfate esters, it will be understood that the process may be interrupted either after the sulfation step to obtain the sulfuric acid esters or after the neutralizing step before the sodium sulfate is added to obtain the salts in the form of a paste.

Suitable sulfating agents which may be used are concentrated or fuming sulfuric acid, and chlorsulfonic acid. The sulfonation temperature may run from 0° to 50° C. but usually a temperature of 30° to 45° C. is preferred.

Sulfonation products produced in accordance with the above example are found to be of great value in the cleansing or detergent art. They have decided foaming and frothing properties and they are also very efficient as dispersing agents, emulsifying agents and as wetting out agents. They are specially adapted to the treatment of textile materials and for cleansing or for wetting purposes.

The mixed sulfate ester salts prepared as above comprise the sulfates of both saturated and unsaturated alcohols. In this type of mixture the unsaturated sulfate, for example, oleyl sulfate, which is normally very water-soluble, actually increases the water solubility of the saturated alkyl sulfates, for example, the cetyl and stearyl sulfates, while at the same time, the latter impart to the unsaturated alkyl sulfates increased detergent and emulsifying efficiency. Where the alcohols used for sulfation contain about 50% unsaturated alcohol and about 50% saturated alcohol unusually good results are obtained in the application of the water-soluble alkyl sulfate esters to the various arts.

The alcohols which are sulfated in accordance with the present invention are normal straight-chain alcohols containing from 8 to 18 carbon atoms, the unsaturated alcohol preferably consisting entirely of oleyl alcohol.

The above example illustrates the preparation of the mixed sodium alkyl sulfates. Other mixed salts, for example, potassium, lithium, ammonium and magnesium salts, as well as the salts of less water solubility may be prepared in the same way.

The above description and example may be varied within reasonable limits, but any such variation which conforms to the spirit of the invention is intended to be included within the scope of the claims.

This application is a continuation in part of applicant's co-pending application, Serial No. 650,203 now issued into Patent No. 1,968,797.

I claim:

1. A composition of matter comprising essentially a mixture containing the sodium salts of cetyl, oleyl and stearyl sulfates.

2. A composition of matter comprising essentially the sodium salts of a mixture containing the sodium salts of cetyl, oleyl and stearyl sulfates obtained by reacting a strong sulfating agent and a mixture containing about 50% cetyl alcohol, about 40% oleyl alcohol, and about 10% stearyl alcohol, then neutralizing the reaction product with sodium hydroxide.

3. The composition of claim 2 characterized in that the alcoholic mixture of which the sulfates are claimed is that obtained by hydrolyzing sperm oil.

4. The process of producing sulfuric acid esters of sperm oil alcohols comprising mixing said sperm oil alcohols with 100% sulfuric acid while maintaining the temperature of the mixture between about 40° and 48° C.

5. The process of producing sulfuric acid esters of sperm oil alcohols comprising slowly adding 100% sulfuric acid into a body of the alcohol while cooling the mass to temperatures within the range of about 40° to 48° C.

6. The process as described in claim 4 wherein the quantities of the acid and alcohols employed are about equal in weight.

7. The process as described in claim 5 wherein the quantities of the acid and alcohols employed are about equal in weight.

8. The process comprising saponifying sperm oil, distilling off the resulting higher aliphatic alcohols, treating said alcohols with a sulfonating agent whereby mixed sulfuric acid esters of said alcohols are obtained, and neutralizing to form salts of said mixed sulfated alcohols.

9. The process comprising adding sodium hydroxide to sperm oil, heating the mass until saponification occurs, separating off the higher aliphatic alcohols obtained, sulfating the alcohols and neutralizing with sodium hydroxide to form water soluble salts of the mixture of higher alcohol sulfates.

10. A composition of matter comprising essentially a mixture of the water soluble salts of cetyl, oleyl and stearyl sulfates.

11. A composition of matter comprising essentially a mixture of water soluble salts of sulfated higher molecular alcohols obtainable from sperm oil, said mixture containing sulfate salts of saturated alcohols and sulfate salts of unsaturated alcohols.

HEINRICH BERTSCH.